United States Patent [19]

Stahl et al.

[11] 4,193,875

[45] Mar. 18, 1980

[54] ROTARY FILTER

[75] Inventors: Werner Stahl; Franz Krappmann, both of Munich, Fed. Rep. of Germany

[73] Assignee: Krauss Maffei AG, Munich, Fed. Rep. of Germany

[21] Appl. No.: 6,290

[22] Filed: Jan. 24, 1979

[30] Foreign Application Priority Data

Feb. 4, 1978 [DE] Fed. Rep. of Germany ....... 2804779

[51] Int. Cl.² ............................................. B01D 33/26
[52] U.S. Cl. .................................................. 210/330
[58] Field of Search .................. 210/330, 331, 345–347

[56] References Cited

U.S. PATENT DOCUMENTS

| | | | |
|---|---|---|---|
| 1,084,383 | 1/1914 | Alinder | 210/345 X |
| 3,061,477 | 10/1962 | Lavallee | 210/347 X |
| 3,201,921 | 8/1965 | Heys | 210/330 X |
| 3,255,888 | 6/1966 | Balfour | 210/330 |

*Primary Examiner*—William A. Cuchlinski, Jr.
*Attorney, Agent, or Firm*—Karl F. Ross

[57] ABSTRACT

A multi-disk rotary filter in which a plurality of disks on a common shaft are partly immersed in a trough containing the suspension to be filtered and each of the filter disks is formed with a plurality of filter sectors or cells each connected to a control disk through which the filtrate is evacuated. According to the invention, each disk is formed with a cell carrier with a radial passage communicating with each sector and merging into an axial passage. The axially extending passages of at least some of the disks are formed at least in part by straight tube sections outwardly of the shaft.

23 Claims, 11 Drawing Figures

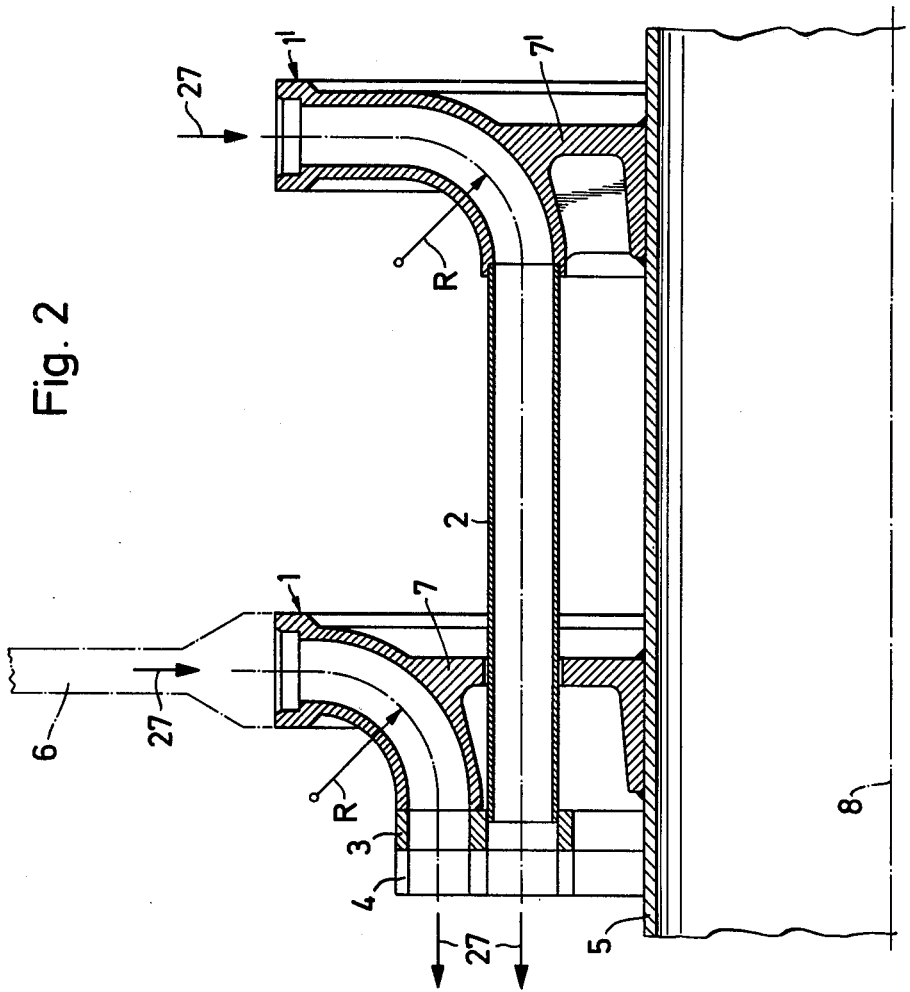

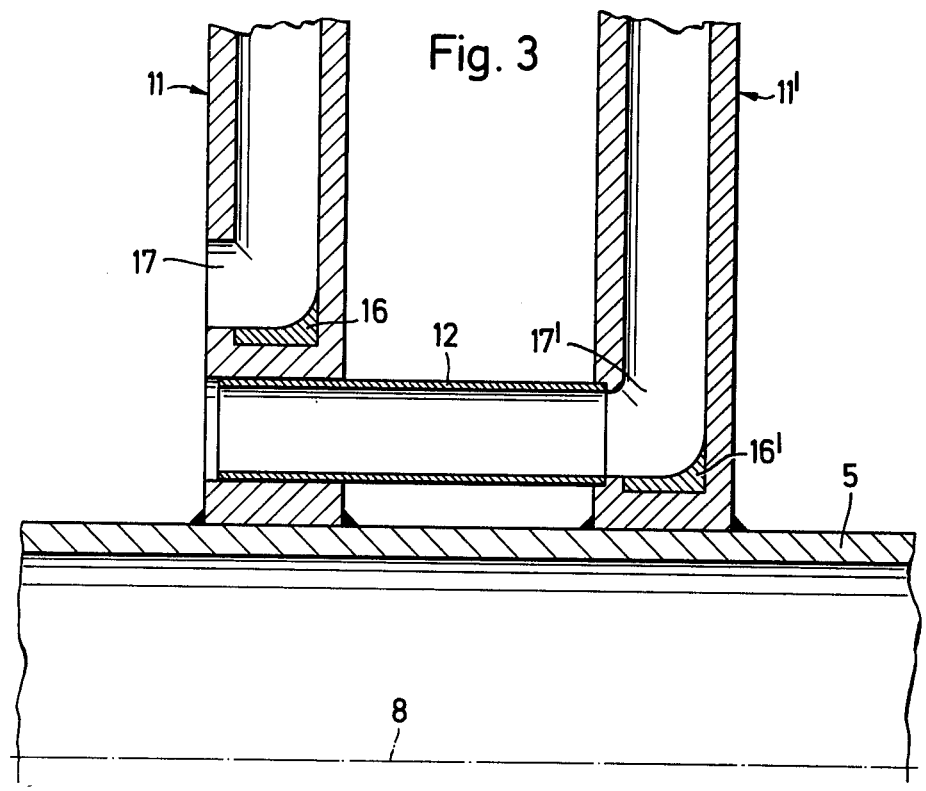
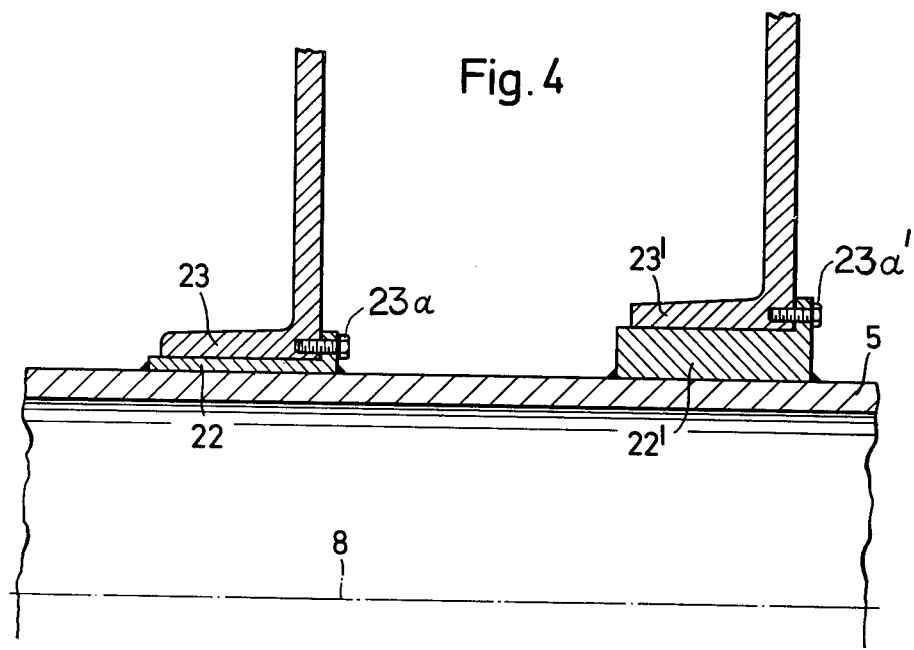

ROTARY FILTER

FIELD OF THE INVENTION

The present invention relates to a multi-disk rotary filter and, more particularly, to a rotary filter in which a plurality of filter disks are mounted upon a rotatable shaft in axially spaced relation to carry the filter surface formed on each disk into a trough containing the suspension to be filtered and the filtrate is evacuated from the respective filter cells, formed as sectors of the disk.

BACKGROUND OF THE INVENTION

Rotary disk filters of the afore-described type are, of course, known in the art and have the advantage that they are relatively compact and provide in a comparatively small space a large filter area which can enable withdrawal of filtrate from the individual filter cells in the suspension, to deposit solids on the filter surface (e.g. filter cloth) and to draw adherent filtrate from the solids when the latter are swung into a drying zone out of the trough.

Rinsing can be effected along the portion of the disk out of the suspension and, indeed, the solids can be treated on the filter disks with other liquids as well (see the commonly assigned, copending application Ser. No. 870,614 filed Jan. 19, 1978).

A filter which functions in this manner is also described in the brochure *Scheibenfilter SSF* published by Krauss-Maffei A.G. In this filter system, each sectoral filter cell is connected by a separate filtrate tube or suction tube to the control disk at which the respective tubes are connected to the respective liquid displacement or aspiration ducts by separate tubes or conduits extending through the interior of the shaft which is hollow.

The control head or disk, with which these conduits communicate, is a distribution valve subdivided into a washing zone, a drying suction zone and a cake-discharge zone at which, respectively, filtrate is pumped from the sector whose conduit registers with the first of these zones, residual fluid is aspirated by a suction pump in the second of these zones to draw air through the cake for drying purposes, and fluid under pressure is fed through the conduit aligned with the third of these zones to dislodge the filter cake from the filter material (cloth) of the disk.

With the prior-art arrangement just described, the filtrate can readily be pumped out of the sectors of the lower quadrants of the disk while air can be drawn through a sector in an upper quadrant and compressed air can be blown into a sector of an upper quadrant for the dislodgment of the filter cake.

A disadvantage of this arrangement is, however, that the provision of a large number of filter disks and a relatively large number of sectors within each disk requires an extremely large number of tubes or conduits which must pass through the shaft. The relatively dense tube bundle makes repair or replacement of the components and conduits difficult and expensive.

The problem is especially pronounced when the tubes or conduits are subjected to wear as is the case when abrasive solids are to be filtered from the suspension and/or solids are to be filtered from corrosive media.

In practice it has been found that the tubes connected to each sector last only for a brief period, e.g. several months, whereupon they must be replaced at considerable cost and by complex maintenance and repair procedures. Naturally during the replacement period, the apparatus is out of service.

Investigations have already been made to attempt to reduce the cost of such apparatus and the maintenance and repair thereof by leading the filtrate from the individual cells of adjacent or successive disks in common through the filter shaft. While this is not usually a problem for the extraction of the filtrate from the sectors immersed in the trough, it does pose a problem when compressed air is to be fed to the sector after drying for dislodging the filter cake. In practice it has been found that the compressed air of systems of the latter type is not distributed uniformly to the filter disks.

The compressed air takes the path of least resistance and is thus concentrated at the disks proximal to the control head and frequently the pressure pulse at more distal disks is insufficient to dislodge the filter cake.

When the filter is not fully dislodged from some of the disks, it is rotated again into the suspension so that additional solids build up to form a thicker filter cake in the regions more remote from the control head.

Eventually these thicker portions of the filter cake retain more moisture, are subject to less drying and, in general, interfere with the uniform operation of the system. The eventual removal of this moist filter cake can even create obstructions in the ducts which carry the filter cake away from the filter.

OBJECTS OF THE INVENTION

It is the principal object of the present invention to provide a rotary disk-type filter having a plurality of disks of the type described which avoids the disadvantages of earlier systems as described above.

Another object of this invention is to provide an improved rotary disk filter which ensures a more uniform distribution of fluid to and from the filter sector than has been possible heretofore.

A further object of our invention is to provide a rotary filter which can be used effectively even for the filtering of abrasive or corrosive suspensions with reduced problems with respect to maintenance and replacement of parts.

Still another object of this invention is to provide a rotary filter which can be easily assembled and disassembled and in which replacement of the filter tubes can be effected at relatively low cost.

SUMMARY OF THE INVENTION

These objects and others which will become apparent hereinafter, are attained in accordance with the invention in a disk filter of the afore-described type which comprises a shaft on which are mounted at least two filter disks with respective cell carriers and a control disk or head whereby communication with the respective sectoral cells is established.

According to the invention, each of the cell carriers has for each sectoral cell a passage which runs radially to the cell and then passes through a curved transition into a substantially axially extending passage which, between the curved transition or elbow and the control disk, is in the form of a straight tube section lying externally of the filter shaft.

Advantageously, the elbow or bend transition portion is formed integrally with the cell carrier, i.e. unitary therewith, while the cell carrier itself is constituted as a case body. The wall of the filtrate passage in the region of the elbow or curved transition has a substantially greater thickness than the wall of the passage elsewhere along its length and it has been found to be desirable to form the elbow such that its axis and indeed the elbow itself lie along a circular arc.

In the latter case, the radius of curvature of the filtrate passage in the region of the elbow or transition is greater than the diameter of the filtrate passage and preferably is about twice this diameter.

According to another feature of the invention, the cell carrier can be disk-shaped and the filtrate passage communicating with each cell can be formed by two substantially perpendicular bores, one of this is generally radial while the other is axial, the bores meeting within the disk-shaped carrier at a curved transition or elbow as described.

In the latter embodiment it has been found to be advantageous to provide a rounded fluid deflection plate along the outer arc of the transition region, this plate being concave inwardly and composed of a low-wear material, e.g. a metal carbide. This deflection plate can be removable from the disk-shaped carrier and can be replaceable therein, e.g. by being received in a seat recessed in the carrier.

In accordance with another aspect of the invention, the tube section of each filter disk more distal from the control disk or head lies radially inwardly of the tube sections of the filter disks closer to the control head. In accordance with this aspect of the invention it is advantageous to pass the tube section of each disk more removed from the control head through the sector or cell carrier of a disk closer to the control head. The tube sections of disk carrier more remote from the control can pass completely through the carrier proximal to this control head and can terminate in a member interposed between the control head and this proximal carrier itself. The ends of the tube sections may be removably held in the carriers or carrier in which they terminate, sealing being effected by O-rings. The tube sections can, alternatively, be threaded into the cell carriers, cemented therein, rolled into engagement with the cell carrier or sintered or fused therein.

The bodies of the cell carriers can have feel which are releasably mounted upon the filter shaft which can be formed with pedestals to which the feet are connected, the outer diameter of each pedestal and the inner diameter of the corresponding cell carrier being increased stepwise from a disk proximal to the control head to a disk distal therefrom.

Finally, in this connection, the tube sections can be oriented such that there is a downward flow from the cell in the drying quadrant. In this case, each of the straight tube sections is inclined relatively to the filter shaft axis in a sense of a twist to provide this downward path.

The principal advantage of the system of the present invention is that the downtime of the unit is minimized and the useful life is increased because replacement of the tube sections need not be as frequent as has heretofore been the case. When, however, replacement of the tube sections is required, this replacement is relatively rapid and at low cost since only the straight tube sections need be replaced with any frequency even when abrasive suspensions are encountered.

This is because the tube sections themselves do not carry the elbows or transition regions. Since tube sections lie wholly externally of the filter shaft, no disassembly of the latter is required and the tube sections are readily accessible and easily tested as to their integrity.

While the greatest wear occurs in the region of the deflection of the filtrate from the radial to the axial portions of the passage, especially when abrasive media are provided, the longer paths in the axial direction cause damage to the tube sections which are more readily replaced. The elbow or transition regions are, because of the greater thickness, replaceability or choice of material, more able to withstand wear.

According to the invention, the filtrate tube may have a relatively large cross section so that it also possesses a larger specific suction cross section than has heretofore been the case, thereby reducing flow resistance and increasing the uniformity of evacuation of the cells or the pressurization thereof.

Naturally, where a disk carrier lies directly against the control head, the straight tube section can be eliminated since the elbow in this case can run directly to the control disk or head or can communicate therewith via a sealing disk.

BRIEF DESCRIPTION OF THE DRAWING

The above and other objects, features and advantages of the present invention will become more readily apparent from the following description, reference being made to the accompanying drawing in which:

FIG. 2 is a view similar to FIG. 1 in which the straight tube sections of a more distal cell carrier terminate in a sealing disk interposed between the control head and the proximal cell carrier;

FIG. 3 is a view similar to FIGS. 1 and 2 but drawn to a larger scale and illustrating still another embodiment of the invention, the control head being omitted in this Figure;

FIG. 4 is a schematic partial section of a system for fastening the cell carrier seat onto the filter shaft;

SPECIFIC DESCRIPTION

The present invention is applicable to multiple-disk filters of the type described in the aforementioned co-pending application and especially in the brochure entitled "Scheibenfilter SSF" published by Krauss-Maffei AG mentioned previously. Although two filter disks have been shown in various Figures and two filter carriers have been illustrated to carry the filter disks, it will be understood that the principles are also applicable to systems in which a larger number of filter disks are provided.

Figure 1:
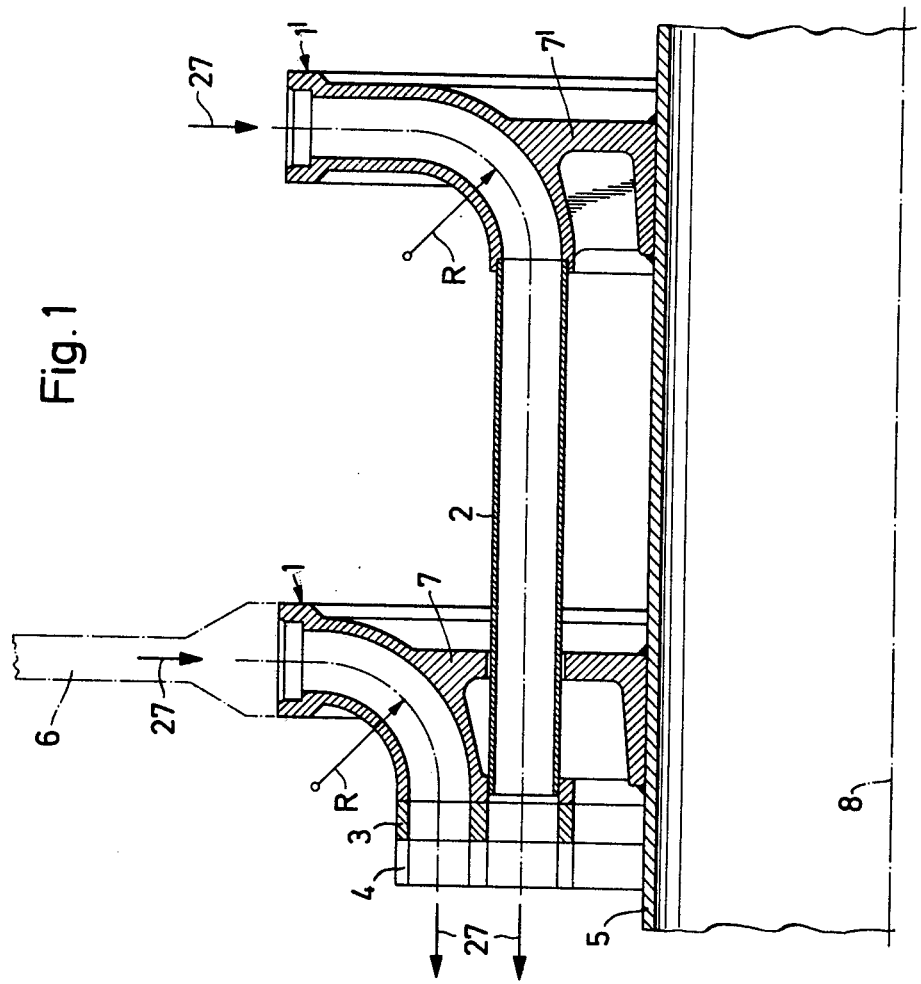
FIG. 1 is a schematic partial section through a preferred embodiment of the invention (best mode) in which the straight tube sections of the filtrate passages terminate in a cell carrier proximal to the control head.

As can be seen from FIGS. 1 and 2, a filter shaft 5, rotatable about the filter shaft axis 8 by means not shown, carries a pair of axially spaced cell carriers 1 and 1'. Thus FIGS. 1 and 2 are only intended to illustrate the principles of the invention while details of the attachment of the two sections to be described below will be apparent from FIGS. 5a–7b, the orientation of the tube sections form FIG. 8, and the means for attachment of the cell carriers 1 and 1' from FIG. 4.

Figure 8:
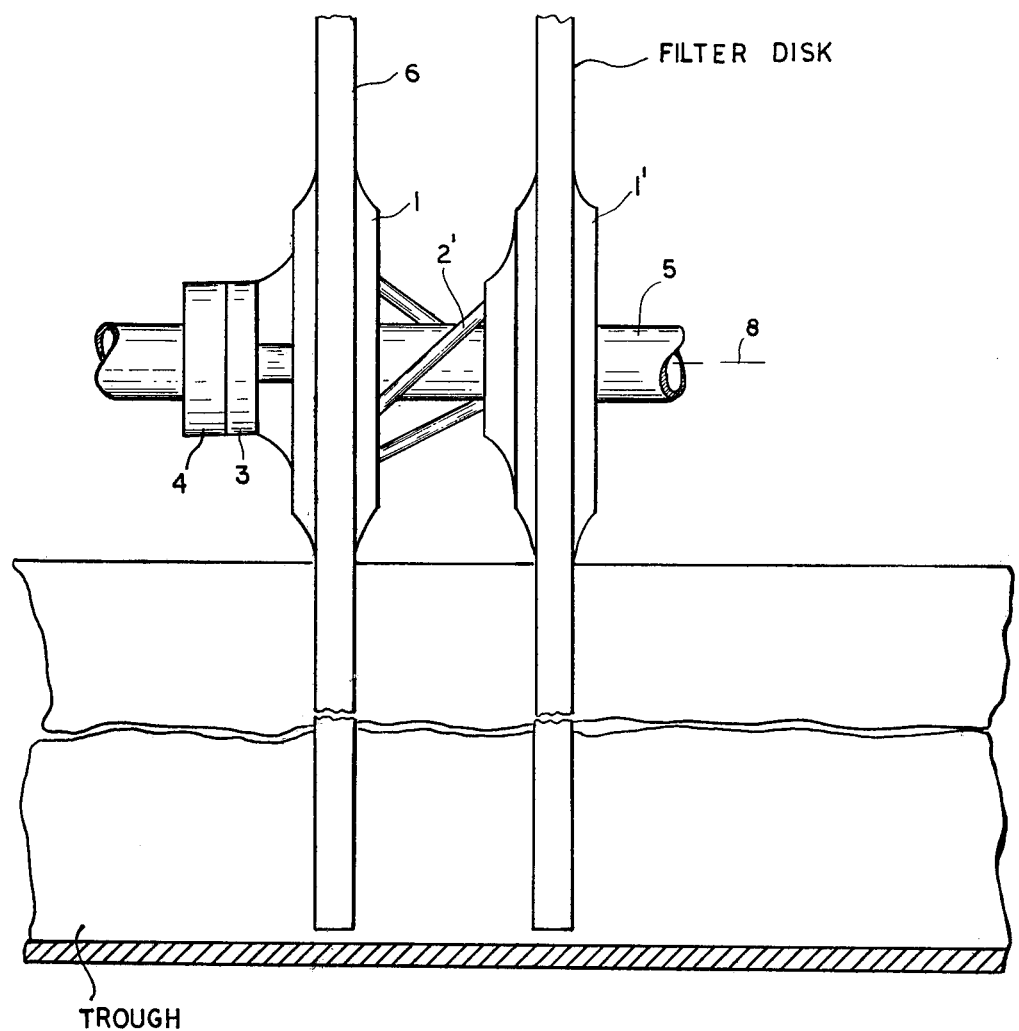
FIG. 8 is a partial elevational view of a disk filter according to the invention, the suspension-carrying trough being broken away.

The cell carrier 1, which is cast in a single piece, has a foot shown to be welded to the periphery of the shaft 5 and carriers a filter disk which is subdivided into sectors each of which forms a filter cell 6. During the suction phases, at least one of which takes place while the filter cell is immersed in a suspension in a trough as shown in FIG. 8, the filtrate is exhausted along a filter passage in the direction of the arrow 27 through the elbow or transition devices 7, 7' of the cell carriers 1, 1', i.e. from a radial portion of the passage through a curved transition portion to an axial portion of the passage.

The filtrate is withdrawn through a sealing disk 3 and further through a control disk 4 forming part of a control head functioning as a distribution valve in a manner known per se.

The filtrate passes, as can be seen from the left-hand side of FIG. 1, from the cell carrier 1 directly into the sealing disk 3 and then into the control head 4 during evacuation of the cell. Naturally, as the cell is rotated out of the suspension, it continues to be subject to suction to draw air through the filter cake and thereby dry the latter, and then to a pressure pulse in which compressed air is momentarily introduced into the cell to cause the filter cake to be dislodged from the filter cloth on the opposite faces of the cell. The successive fluid flow from and to the cell is controlled by the distribution valve function of the control head 4.

The elbow or transition regions 7 of the cell carriers 1 and 1' have a relatively large arc, i.e. correspond to circular arcs bent to a radius of curvature R which is approximately twice the diameter of the filtrate passage.

When the cell carriers are, as shown in FIGS. 1 and 2, cast unitarily of a wear-resistant material, they have an especially long useful life, which is augmented by forming the outer arc portion of each elbow of greater thickness than the remaining wall thickness of the passage. This has been found to permit the system to withstand extremely long oscillating periods even with exceptionally abrasive suspensions.

The filtrate from the cell carrier 1' in FIGS. 1 and 2, after leaving the respective elbow or transition member 7, 7', passes into a removable tube section 2 which traverses the cell carrier 1 and terminates in the left-hand portion of this cell carrier (FIG. 1) or directly in the sealing disk 3 (FIG. 2), the various methods by which the straight tube section 2 of each cell carrier are affixed and sealed being illustrated in FIGS. 5a–7b.

The arrangement of FIG. 2 thus differs from that of FIG. 1 only in that the straight tube sections 2 of FIG. 2 extends completely through the cell carrier 1 and is fixed in the sealing disk 3 by one of the techniques shown in FIGS. 5a–7b.

In order to replace the straight tube sections 2 of the system, it is only necessary to withdraw the tube section through the control and sealing disks to the left and to insert a new tube section.

Since the straight tube sections 2 lie externally of the filter shaft 5, they are readily acceptable and can be free from any curves or bends which prevent ready replacement or increase the wear. Replacement can then be effected rapidly in a short time so that the filter will have a minimum down time during such maintenance.

While the elbow portions 7 and 7' of FIGS. 1 and 2 have each been shown to the same radius of curvature R for the respective elbow, it has been found to be advantageous in some instances to impart a greater radius of curvature for the elbow 7' more distal from the control head 4. This permits the filtrate passage of each more distal cell carrier to be located closer to the shaft 5.

While FIGS. 1 and 2 have, for the sake of simplicity of illustration, shown only two filter disks, it will be readily apparent that the device is not limited to two such disks and further disks may be provided in axially spaced relationship along the shaft with each more distal carrier having its filtrate passages lying inwardly of the filter carriers more proximal to the control head 4. In this case, each additional filter carrier will have straight tubes which pass through all of the preceding filter carriers before terminating in the sealing disk 3 or the first or proximal carrier 1.

The tubes are thus of progressively greater length.

FIG. 3 illustrates an embodiment which is an alternative to that of FIGS. 1 and 2 and in which the cell carriers 11, 11' are generally of disk shape and carry the filter disks in their respective cell as previously described. In this embodiment, however, each filtrate passage forms a respective sectoral filter cell comprises a radial bore which merges with an axial bore at an elbow or transition region 17, 17', the two bores being substantially perpendicular to one another.

The flow deflection between the radial bore and the axial bore is effected at the elbow or transition region at which, along the outer arc of the elbow, a deflection plate 16 or 16' is provided. Each of these inwardly concave deflection plates is removably seated in a recess formed in the respective cell carrier 11, 11'.

These deflection plates 16 and 16' perform a dual function in that they provide a smooth direction change of the filtrate flow and, in addition, can be replaced. The deflection plates 16 and 16' are formed from a low-wear material, such as tungsten carbide, with the filter plate being removable and replaceable together with or at different intervals from the removal and replacement of the straight tube sections 12 which function in the same manner as the tube sections 2 described previously.

FIG. 4 shows that the filter shaft 5, which is rotatable about the shaft axis 8, can be provided with a pedestal 22 for the cell carrier foot 23 of the cell carrier proximal to the control head. A corresponding pedestal 22' of greater outer diameter can be provided for the more distal cell carrier whose foot is shown at 23'.

According to the invention, the cell carriers are held in place upon the pedestals 22, 22' by screws 23a and 23a' threaded into the heels of the seat 23, 23', respectively.

Naturally, the mounting system of FIG. 4 can be used with the embodiments of FIGS. 1, 2 and 3 as well.

In all cases, the outer diameter of the pedestal 22 is smaller than the inner diameter of the cell carrier foot 23' so that the more distal cell carriers can be simply slid over the preceding pedestals from left to right along the shaft. Naturally, when a three-disk filter is employed, a third pedestal is provided in axially spaced relationship to the right of pedestal 22' and its cell carrier has an inner diameter greater than the outer diameter of cell carrier 22.

FIGS. 5a–7b show various methods of fastening the straight tube section 2 in the cell carrier 1 or in the sealing disk 3.

Figure 5A:
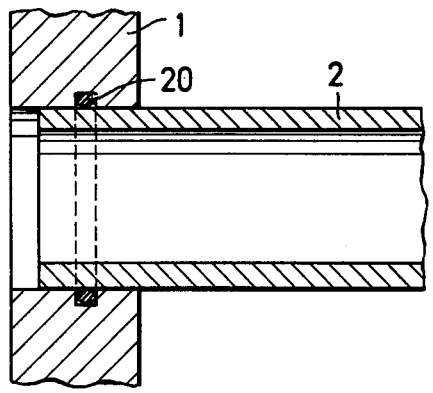
FIGS. 5a–7b are detail views illustrating various attachment techniques whereby the straight tube sections are affixed in the cell carrier or in the sealing disk.

For example, in FIG. 5a, an O-ring 20 is recessed in an inwardly open groove in the cell carrier 1 and frictionally grips and seals the tube section 2.

Figure 5B:
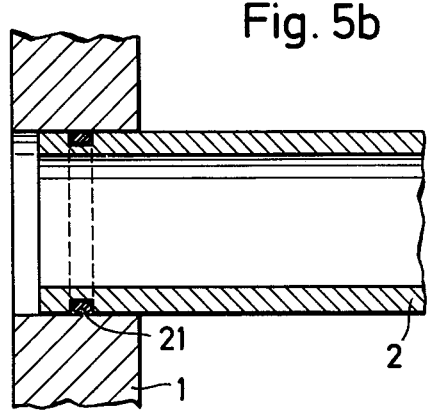

FIG. 5b shows that a similar system applies when the O-ring 21 is lodged in an outwardly open annular groove in the tube section 2 to engage a smooth-surfaced wall of a bore of the carrier 1 into which the tube section 2 is inserted.

Figure 6A:
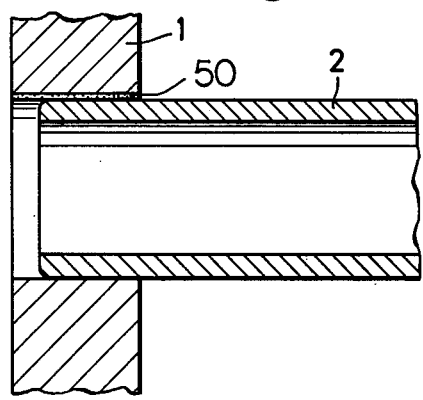
Figure 6B:
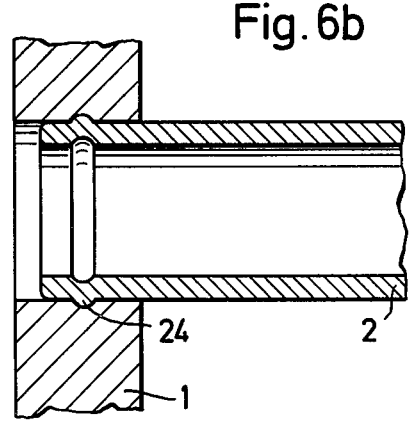

FIG. 6a illustrates an arrangement in which the tube section 2 is cemented into the cell carrier 1, e.g. by a layer of cement 50. FIG. 6b indicates that a swaging technique can be used by rolling an annular bulge 24 in the tube section 2 which is forced into the material of the cell carrier 1 to anchor the tube 2 therein.

Figure 7A:
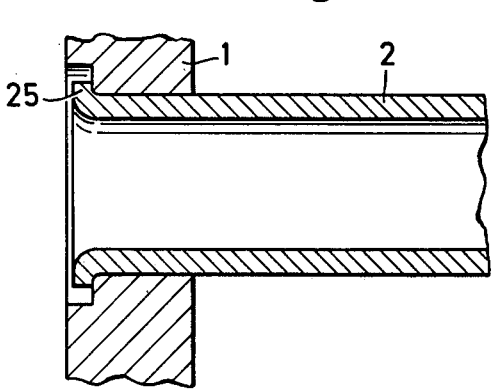
Figure 7B:
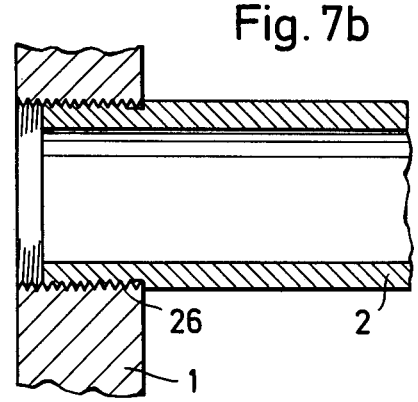

Another swaging technique has been shown in FIG. 7a in which an outward flange 25 is formed on the end of the tube section 2 and engages in a corresponding recess countersunk in the cell carrier 1. In the embodiment of FIG. 7b, the tube section 2 is externally threaded and is screwed into the internal thread in the cell carrier 1.

The fastening and sealing systems of FIGS. 5a–7b can be used individually or in combination in accordance with the applications of the system.

While the Figures of the drawing which have been discussed previously indicate that straight tube sections which are substantially parallel to the filter shaft axis 8 are provided, the filtrate runoff during the suction phase can be increased by inclining the straight tube sections relative to the filtrate shaft axis 8 to form a flow gradient. Such an arrangement has been illustrated in FIG. 8 in which the incline of the tube sections 2' has been illustrated. In this case, the bore of the carrier 1 in which the tube section 2' is received can be similarly inclined so that withdrawal of the straight tube sections 2' is as simple as in the embodiments previously discussed.

We claim:

1. A rotary disk filter comprising a filter shaft, a plurality of filter disks mounted on said shaft in axially spaced relation and rotatable into a trough containing a suspension to be filtered and out of said trough to dry a filter cake upon the respective disk, each of said disks having a plurality of sectors forming respective filter cells and a cell carrier provided with filtrate passages respectively communicating with said cells, and a control head surrounding said shaft and communicating successively between the passages of each disk and an external conduit, one of said disks being relatively proximal to said control head and another of said disks being relatively distal from said control head, each of said passages having a bend connecting a radial portion with an axial portion, the axial portions of said passages of said distal carrier being formed by respective straight tube sections disposed externally of the filter shaft.

2. A rotary filter as defined in claim 1 wherein each of said bends is formed unitarily with the respective cell carrier and each of said cell carriers is constituted as a cast body.

3. A rotary filter as defined in claim 2 wherein the wall thickness of each filtrate passage in the region of the respective bend is of greater thickness than elsewhere along the filtrate passage.

4. A rotary filter as defined in claim 1 wherein each bend is formed along a circular arc.

5. A rotary filter as defined in claim 4 wherein the radius of curvature of the respective arc of each bend is greater than the diameter of the respective passage.

6. A rotary filter as defined in claim 5 wherein the radius of curvature of the arc of each bend is about twice the diameter of the respective passage.

7. A rotary filter as defined in claim 1 wherein each cell carrier is generally of disk shape and the respective bend is formed between two substantially perpendicular bores meeting within the respective carrier, one of the bores being generally radial and the other being generally axial.

8. A rotary filter as defined in claim 7 wherein each bend has an outer curve, the outer curve of each bend being formed by a deflection plate, said deflection plate being removably mounted in the respective carrier.

9. A rotary filter as defined in claim 8 wherein each deflection plate is constituted from a low-wear material.

10. A rotary filter as defined in claim 1 wherein the tube section of a disk more distal from said control head lies inwardly of the passage of a disk more proximal to the control head.

11. A rotary filter as defined in claim 10 wherein each tube section of a disk more distal from the control head passes through each carrier of disks more proximal to said control head.

12. A rotary filter as defined in claim 1 wherein said tube sections of said distal carrier terminate within the proximal carrier.

13. A rotary filter as defined in claim 1 wherein the tube sections of the distal carrier pass through the carrier of the proximal disk and terminate in a sealing disk between the control head and the proximal carrier.

14. A rotary filter as defined in claim 1 wherein at least one end of each tube section is removably fitted in a respective cell carrier.

15. A rotary filter as defined in claim 14, further comprising an O-ring recessed in a respective cell carrier and engaging said end of each tube section.

16. A rotary filter as defined in claim 14 wherein said end of said tube section is formed with a recess receiving an O-ring engaging the respective carrier.

17. A rotary filter as defined in claim 14 wherein said end of each tube section is threaded into the respective cell carrier.

18. A rotary filter as defined in claim 14 wherein said ends of said tube sections are cemented in the respective cell carrier.

19. A rotary filter as defined in claim 14 wherein each of said ends of said tube sections is connected to the respective carrier by rolling a bulge in the respective end.

20. A rotary filter as defined in claim 14 wherein each of said ends of said tube sections are flanged outwardly to engage the respective cell carrier.

21. A rotary filter as defined in claim 1 wherein said cell carriers are formed with feet releasably mounted upon respective pedestals on said shaft, the internal diameter of each cell carrier foot more distal from said control head being greater than the outer diameter of the pedestals of carriers lying more proximal to said control head.

22. A rotary filter as defined in claim 21 wherein each foot is secured to the respective pedestal by at least one screw.

23. A rotary filter as defined in claim 1 wherein the straight tube sections are inclined to the axis of said shaft to provide a downward gradient for a liquid at least during removal of liquid from the filter cake.

* * * * *